United States Patent [19]
Ogino

[11] Patent Number: 5,279,184
[45] Date of Patent: Jan. 18, 1994

[54] SHOE FIXING DEVICE OF BICYCLE PEDAL

[75] Inventor: Kouichiro Ogino, Saitama, Japan

[73] Assignee: Mikashima Industrial Co., Ltd., Saitama, Japan

[21] Appl. No.: 997,787

[22] Filed: Dec. 29, 1992

[51] Int. Cl.⁵ .......................................... G05G 1/14
[52] U.S. Cl. ................... 74/594.6; 74/594.4; 36/131
[58] Field of Search ............. 74/594.6, 594.4; 36/131, 132

[56] References Cited

U.S. PATENT DOCUMENTS

| | | | |
|---|---|---|---|
| 4,488,453 | 12/1984 | Drugeon et al. | 74/594.6 |
| 4,899,618 | 2/1990 | Christol | 74/594.6 |
| 4,947,708 | 8/1990 | Lacombe | 74/594.6 |
| 5,048,369 | 9/1991 | Chen | 74/594.6 |
| 5,060,537 | 10/1991 | Nagano | 74/594.6 |
| 5,081,883 | 1/1992 | Romano | 36/131 X |

FOREIGN PATENT DOCUMENTS

| | | | |
|---|---|---|---|
| 428140 | 5/1991 | European Pat. Off. | 74/594.6 |
| 2432427 | 4/1980 | France | 36/131 |
| 2624470 | 6/1989 | France | 74/594.6 |

Primary Examiner—Leslie A. Braun
Assistant Examiner—Ryan W. Massey
Attorney, Agent, or Firm—Koda and Androlia

[57] ABSTRACT

A shoe fixing device employed to a pedal of a mountain bike. A cleat is secured to a tread of the pedal body. A front edge and an inner edge of the cleat are held by a fixed inner side supporting member adapted to engage with the inner edge and a fixed outer side supporting member adapted to engage with an outer edge of the cleat. An outer edge of the cleat engages with a movable supporting member, an engagement convex portion formed on a side edge of the cleat engages with an engagement concave portion formed on the supporting member holding the cleat or the shoe on the pedal.

2 Claims, 4 Drawing Sheets

SHOE FIXING DEVICE OF BICYCLE PEDAL

BACKGROUND OF THE INVENTION

1. Field of the Invention

The present invention relates to a shoe fixing device applied to a pedal of a bicycle, or that particularly suitable to a pedal of a mountain bike.

2. Description of the Prior Art

Nowadays, various kinds of the shoe fixing device used on a bicycle pedal fixing the shoe fixing device to the shoe without using toe clips have been proposed and practiced. Apparently, these conventional shoe fixing devices are applied to use on the pedals of the road race bicycles and the track race bicycles. Every shoe fixing device mentioned above has an engagement member, engaging with a front and rear portions and a left and right portions of the cleat attached to the shoe bottom so as to protrude from the bottom, and holding the shoe in place.

It is apparent from a purpose of it that the mountain bike is apt to be shouldered on the user when the mountain bike is ridden on mountainous roads and the rider walks with the bike on his or her shoulder. The conventional shoes provided with the cleats protruding from the shoe bottoms are not suitable to walk along such mountaneous or steep roads. In other words, it is difficult to smoothly walk along such roads with the conventional shoes mentioned above, so that it is necessary to use shoes having small cleats not protruding from the shoe bottoms. The shoe provided with such a small cleat necessitates a particular shoe fixing device employed to the bicycle pedal, which device is suitable to the small cleat.

One of the shoe fixing device suitable to the pedal of the mountain bike is disclosed in Japan Patent Application Laid-open Heisei 3 (1991) No. 157285. According to the invention disclosed in the Japan Patent Application above, the conventional shoe fixing device adapted to use on the mountain bike pedal has engagement members so attached to a front portion and a rear portion of the pedal footboard or tread as to engage with the front face and the rear face of the cleat. These engagement members are rotatably attached to a shaft in parallel to a pedal shaft and urged toward their engagement direction by means of springs.

It is noted that assembling and adjusting the engagement members of the pedal footboard are difficult and troublesome, since these members have springs each installed on them.

SUMMARY OF THE INVENTION

It is a purpose of the present invention to provide a shoe fixing device suitable, in particular, to the pedal of a mountain bike, simple in structure, and easy to adjust.

Accordingly, the shoe fixing device of the present invention has the construction mentioned below in order to attain the purpose above.

A front supporting member engaging with a front edge of the cleat of the bicycle pedal and an inner side supporting member engaging with an inner edge of the cleat are fixed to the footboard of the pedal body. An outer side supporting member engaging with an outer edge of the cleat is attached to the footboard. The outer side supporting member is adapted to be pressed toward the inner side supporting member and able to move along the direction of the pedal shaft. The inner side supporting member and the outer side supporting member, respectively have an engagement convex portion formed on a side edge of the cleat and an engagement concave portion adapted to engage with the engagement convex.

The outer side supporting member can move in circle and also in horizontal directions. It is possible to fix the outer side supporting member rotatably on a shaft at a right angle to the pedal shaft (claim 2) and to fix it so as to horizontally move along a direction in parallel with the pedal shaft (claim 3).

According to the present invention, the front edge of the cleat on the footboard is supported by the front supporting member, the inner edge by the inner side supporting member, and the outer edge by the outer side supporting member. The engagement convex portion of the cleat engages with the inner side supporting member and the engagement concave portion of the outer side supporting member. That is, the front supporting member holds the cleat or shoe along an up-and-down direction of the shoe, the inner and outer side supporting members hold the cleat or shoe along a right-and-left direction, and the engaged condition of the engagement convex portion and the engagement concave portion holds or restricts the cleat along a front-and-rear direction of the shoe.

The outer side supporting member is able to move along a direction of the pedal shaft. As a result, when the cleat or shoe is mounted, it is necessary to push up the cleat from above the supporting member so as to move the outer side supporting member and the outer side supporting member is escaped from the cleat. Because the outer side supporting member is urged, it moves toward the cleat, when the cleat passes over the outer side supporting member, supporting the cleat. On the contrary, when the cleat is displaced, the cleat or shoe moves outside and the outer side supporting member moves, resulting in a displacement of the cleat.

DETAILED EXPLANATION OF THE PREFERRED EMBODIMENT

Figure 1:
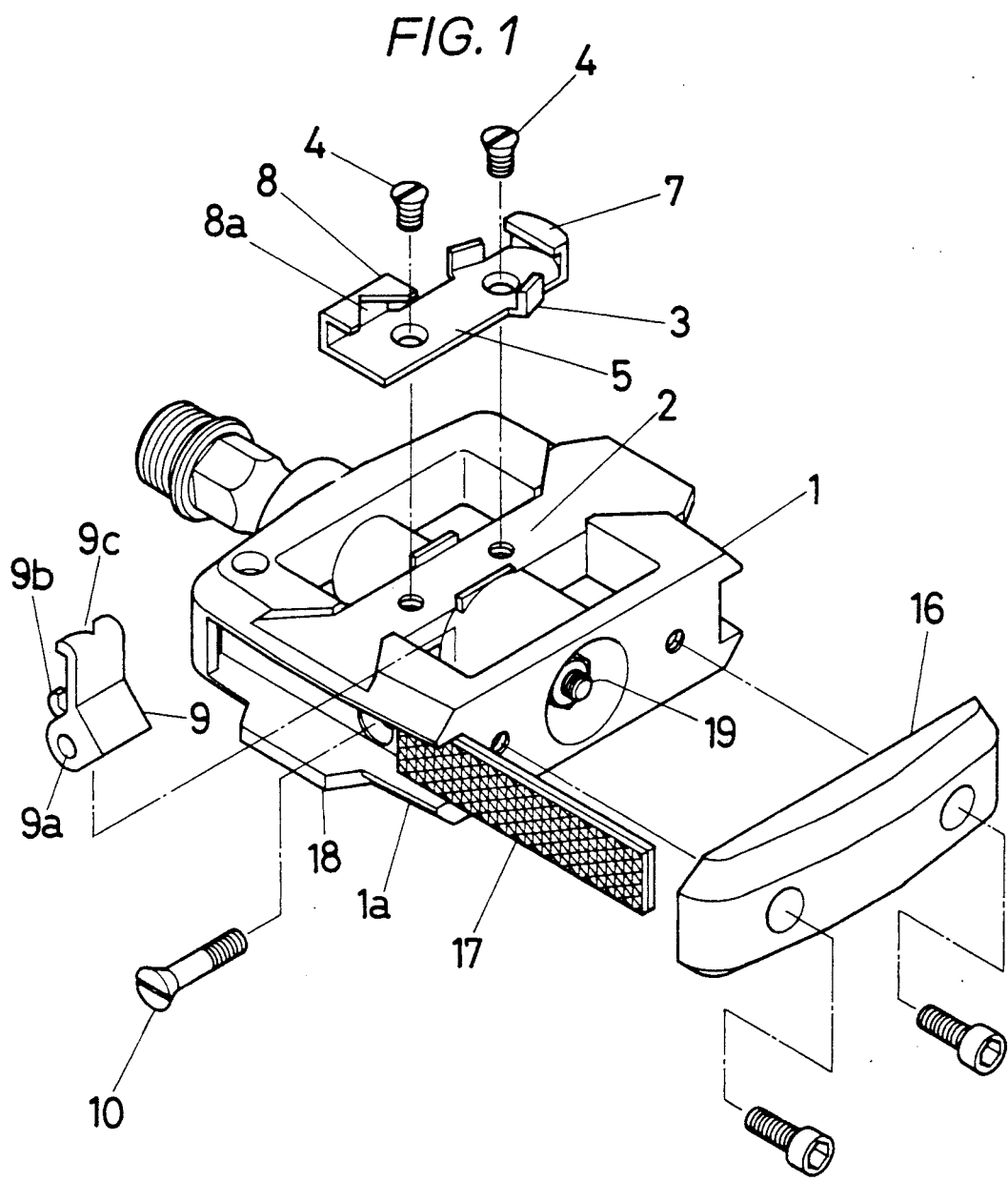
FIG. 1 is an exploded perspective view of the shoe fixing device of a bicycle pedal according to one of the embodiments of the present invention.

As apparently shown in FIG. 1, an installation part 2, on which a fixing supporting plate 3 is installed, is provided on an outer side of the footboard of the pedal body 1. Through screws 4, the fixing supporting plate 3 is secured to the installation part 2. The fixing supporting plate 3 has the front supporting member 7 engaging with a front edge 6a of the cleat 6, which front supporting member 7 is placed at a front end of a base plate 5 and the inner side supporting member 8 engaging with the inner edge 6b, placed at a side of the bicycle when it is installed or used, of the cleat 6. The inner side supporting member 8 is placed at a side of the base plate 5. Both the supporting members are made in a shape of ] in section in order to be able to engage with edges of the cleat 6. The inner side supporting member 8 has at its edge an engagement concave portion 8a adapted to engage with the engagement convex portion 6c formed on the cleat 6.

An outer side supporting member 9 engaging with the out side edge 6d of the cleat 6 is attached on an outer side of a rear portion of the pedal body 1 so as to face to the inner side supporting member 8. A shaft passing-through hole 9a is formed on a base portion of the outer side supporting member 9. A spring receiving foot 9b is connected to a front inner side of the shaft passing-through hole 9a. The outer side supporting member 9 has an engagement concave portion 9c adapted to engage with an engagement convex portion 6e of the cleat 6.

Figure 4:
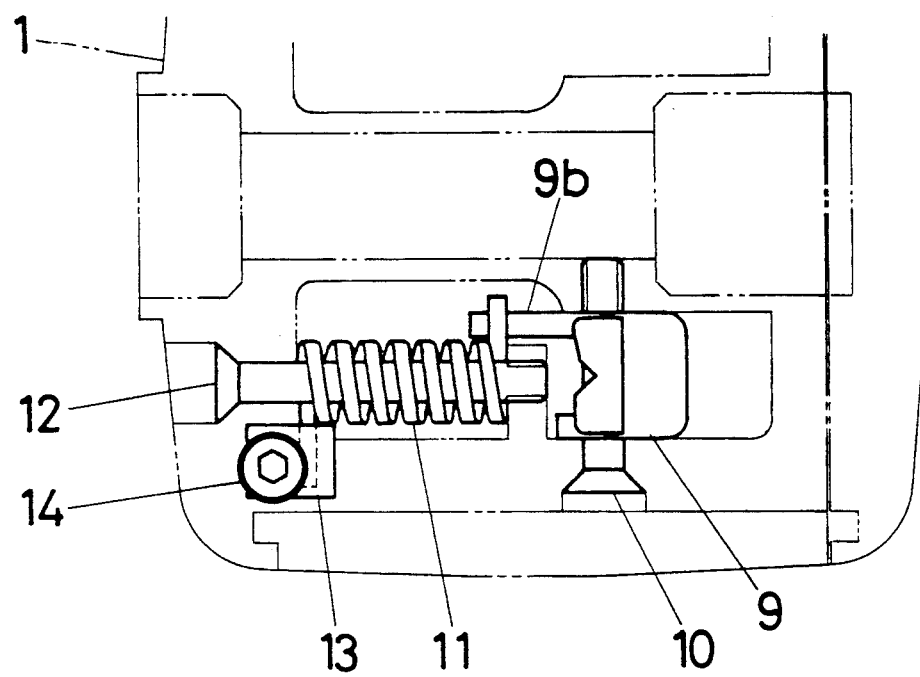
FIG. 4(a) is a plan view showing an urging mechanism for the outer member of the shoe fixing device.
FIG. 4(b) is a side elevation depicting the urging mechanism of FIG. 4(a).
Figure 4:
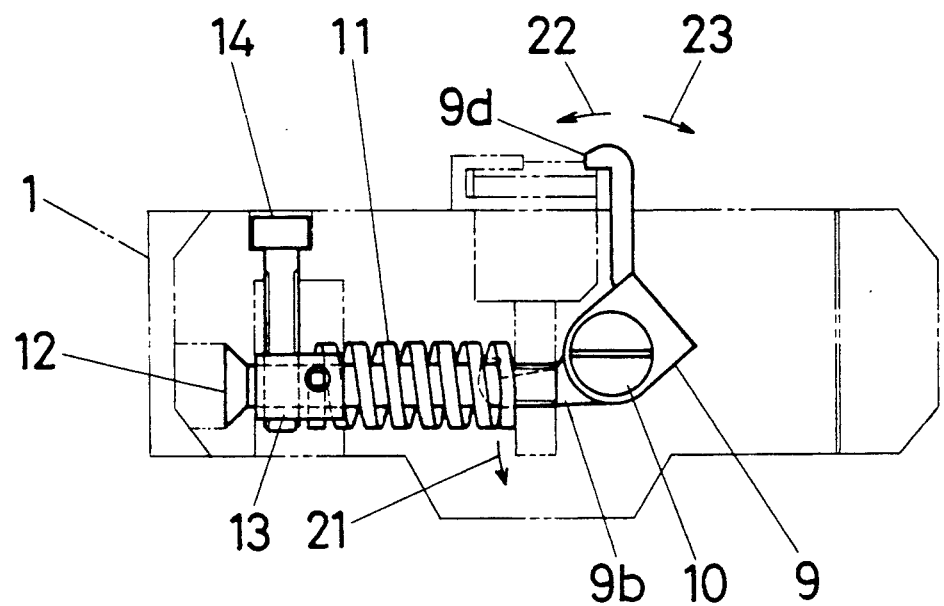

The outer side supporting member 9 having the construction and shape mentioned above is rotatably attached to the pedal body 1 by passing a shaft 10 through the shaft passing-through hole 9a, which shaft 10 had passed through a rear frame 1a of the pedal body 1. The outer side supporting member 9 is urged to a side of the inner side supporting member 8 by means of a coil spring 11. The urging mechanism for pressing the outer side supporting member 9 is shown in FIG. 4 (a) and (b).

Figure 2:
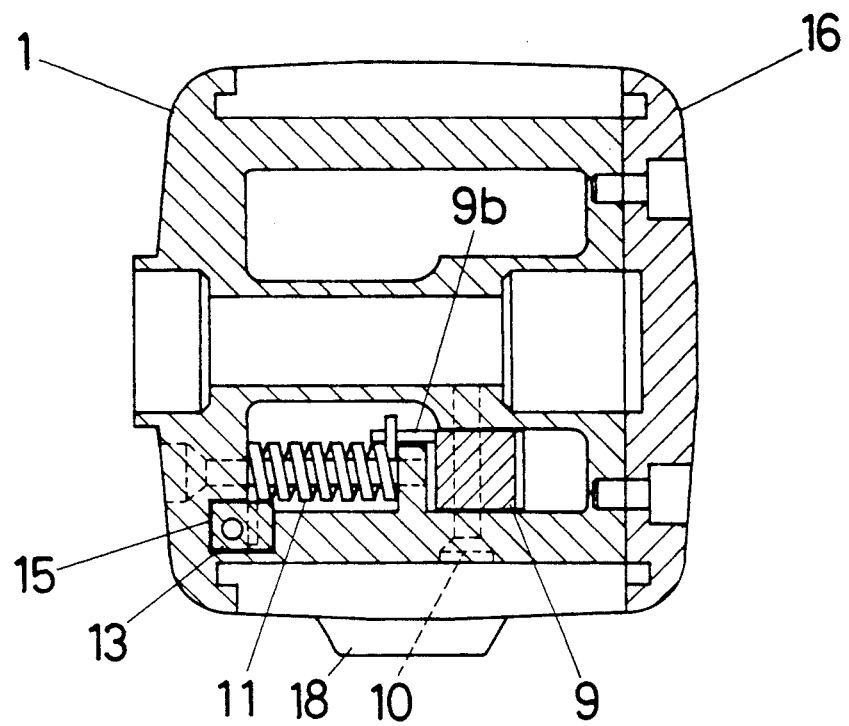
FIG. 2 is a section of the pedal body.
Figure 5:
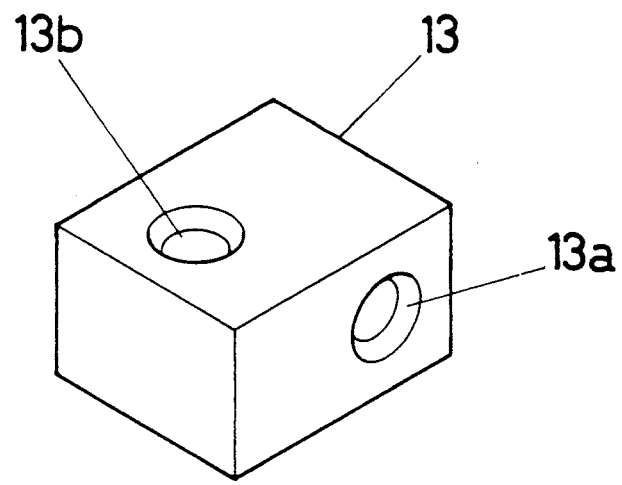
FIG. 5 is a perspective view of an indicator to be mounted in the pedal body.

Explaining the urging mechanism in detail, the coil spring 11 is installed on a screw pestle 12 passing-through a rear portion of the pedal body 1 and secured there. One end of the coil spring 11 engages with the spring receiving foot 9b of the outer side supporting member 9 in order to raise the spring receiving foot 9b. Another end of the coil spring 11 engages with an indicator 13 attached to the pedal body 1. As shown in FIG. 5, the indicator 13 is formed in square, has a hole 13a through which an end portion of the coil spring 11 passing along a front-and-rear direction of the indicator 13, and a threaded hole 13b for an indicator fastening screw 14. The threaded hole 13b extends along an up-and-down direction of the indicator 13. The indicator 13 is as shown in FIG. 2 installed on an indicator installation portion 15 formed in the rear portion of the pedal body 1 so as to be able to rise or lower by means of the indicator fastening screw 14 passing through the pedal body 1.

Figure 3:
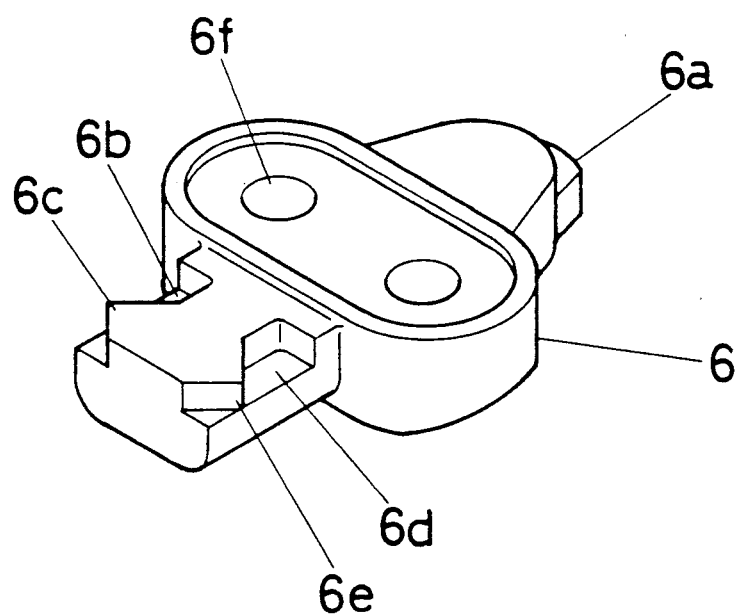
FIG. 3 is a perspective view of the cleat suitable to the shoe device according to the embodiment.

The pedal body 1 has a cap 16 which is fastened to the pedal body 1 by means of screws, a reflector 17 applied to the rear side of the pedal body 1, a kick-back portion 18 extending from the rear side, and a pedal shaft 19 passing through the pedal body 1. As shown in FIG. 3, the cleat 6 has a set of through holes 6f through which the shoe fastening screws of the cleat pass. It is noted that the back face of the pedal body 1 is shown as a footboard or tread having no shoe fixing device of the present invention. However, it is apparent that the shoe fixing device can be installed on the back face of the pedal body 1 making the pedal body of a mountain bicycle more useful.

An operation of the shoe fixing device of the embodiment of the present invention will be described.

In an ordinal condition of the shoe fixing device, the outer side supporting member 9 is urged along a direction of arrow 21 shown in FIG. 4(b) through the spring receiving foot 9b and, as a result, the outer side supporting member 9 wholly moves along the arrow 22. The gap distance between the outer side and the inner side supporting members is determined so as to be narrowed making the cleat 6 engage with them. When the spring receiving foot 9b of the outer side supporting member 9 is forcibly pushed down after the front edge 6a of the cleat 6 engages with the front supporting member 7, a downward force of the cleat 6 revolves the outer side supporting member 9 along a direction of arrow 23 shown in FIG. 4(b). In order to make such revolution easy, the upper face 9d of the outer side supporting member is made to be downward slanted.

The outer side supporting member 9 returns to its original position due to a force of the coil spring 11 after an engagement edge of the cleat 6 passes over the outer side supporting member 9, so that the cleat 6 is held by the front supporting member 7, the outer side supporting member, and the inner side supporting member. The engagement convex portion 6c and the engagement convex portion 6e, respectively formed on the cleat 6 engage with other engagement concave portions 8a and 9c of the inner and the outer side supporting members, whereby the cleat 6 is restricted from moving along its front-and-rear direction and the shoe is firmly held on the pedal of the mountain bike.

Figure 6:
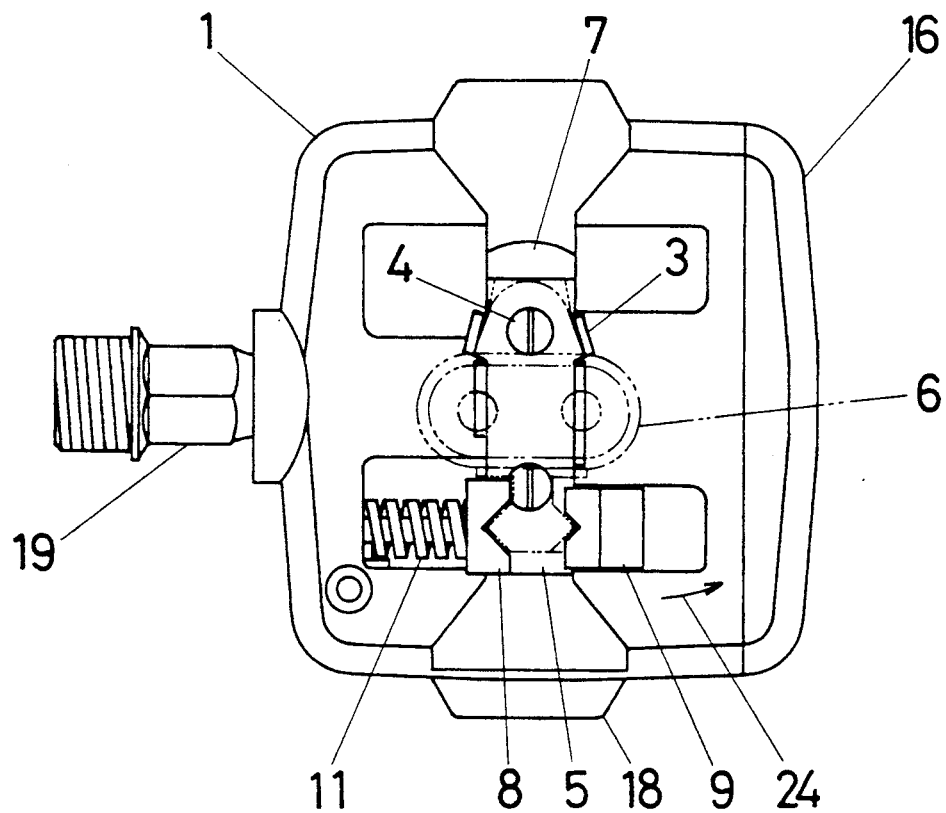
FIG. 6 a plan view of the shoe fixing device of the present invention in operation.

While, disengaging the shoe from the shoe fixing device of the present invention, the user twists the shoe with his or her twisting foot so as to rotate the rear portion of the cleat 6 along the direction of arrow 24 shown in FIG. 6. Consequently, the outer side supporting member 9 rotates along the arrow 23 shown in FIG. 4 widening the gap between the inner and the outer side supporting members. Then, it is possible to release an engagement of the cleat 6 with the shoe resulting in free of the shoe. During a twisting motion of the shoe, the cleat 6 moves describing an arc around the front end of the cleat. While, the outer side engagement member 9 moves in parallel with the direction of the pedal shaft, so that the engagement convex portion 6e of the cleat 6 disengages from the engagement concave portion 9c of the outer side supporting member 9, the engagement convex portion 6e moves along an edge of the engagement member pushing further the outer side engagement member 9 outwardly and disengaging the outer side edge 6d of the cleat from the engagement member 9, resulting in an easiness of disengagement of the cleat.

According to the embodiment above, the front supporting member and the inner side supporting member are united, thereby their assembling is easy and there is hardly a shift in position of two fixing supporting members. Because the coil spring 11 has an indicator 13 mounted thereon, it is possible to control an urging force of the coil spring 11 for the outer side supporting member 9.

In addition, according to the preferred embodiment of the shoe fixing device of the present invention, the outer side supporting member 9 is given an energy from a resilient force of the coil spring 11 effective along its rotational direction through the spring receiving foot 9b. However, it is possible to change the urging mechanism or structure for the outer side supporting member 9 to a mechanism in which the coil spring 11 is directly applied to an outer side face of the outer side supporting member 9 in order to press the outer side supporting member 9 along a direction of arrow 22 or another mechanism in which the coil spring 1 is directly applied to, on the contrary, an inner side face of the outer side supporting member 9 in order to pull the supporting member 9 along a direction of arrow 22.

In the embodiment, the outer side supporting member 9 revolves around the shaft in order to change the distance between the inner side supporting member and the outer side supporting member. However, it is possible to change the distance between both the supporting members by horizontally shifting the outer side supporting member 9 in parallel with the direction of the pedal shaft. In such case, the outer side supporting member is mounted on the guide rail and it is urged by a spring.

Furthermore, according to the preferred embodiment above, a shoe fixing device of the present invention is installed on only one of the footboard or tread of the pedal body. However, according to the taste or use condition of a user, it is possible to decide not fixing the shoe to the pedal of the mountain bike or to employ two shoe fixing devices on the front and the rear faces of the treat of the pedal body.

According to the present invention, the front supporting member and the inner, which are of stationary type, adapted to engage with the cleat, and the movable outer side supporting member are installed on the pedal body, so that the cleat can be removably secured to the pedal. Because the inner side supporting member and the outer side supporting member have engagement concave portions respectively adapted to engage with the engagement convex portions formed on the cleat, the cleat is restricted from moving along its front-and-rear direction without supporting or holding the rear portion of the cleat by means of a special supporting device.

What is claimed is:

1. A shoe fixing device of a bicycle pedal comprising a pedal provided with a front supporting member engaged with a front edge of a cleat, an inner side supporting member engaged with an inner edge of said cleat, and an outer side supporting member engaged with an outer edge of said cleat, wherein:

said outer side supporting member is urged toward said inner side supporting member and is able to move along a direction of a pedal shaft;

said outer side supporting member is rotatably fixed to a shaft perpendicular to said pedal shaft; and said inner side supporting member and said outer side supporting member have engagement concaves adapted to engage with engagement convexes formed on the side edges of the cleat.

2. A shoe fixing device of a bicycle pedal comprising a pedal provided with a front supporting member engaged with a front edge of a cleat, an inner side supporting member engaged with an inner edge of said cleat, and an outer side supporting member engaged with an outer edge of said cleat, wherein:

said outer side supporting member is coupled to a pedal shaft so as to move in parallel with the pedal shaft;

said outer side supporting member is urged toward said inner side supporting member and is able to move along a direction of a pedal shaft; and said inner side supporting member and said outer side supporting member have engagement concaves adapted to engage with engagement convexes formed on the side edges of the cleat.

* * * * *